United States Patent
Forlini

[15] 3,655,267
[45] Apr. 11, 1972

[54] LIGHT VALVES WITH HIGH FREQUENCY EXCITATION

[72] Inventor: Matthew Forlini, Ozone Park, N.Y.
[73] Assignee: Research Frontiers, Inc., Plainview, N.Y.
[22] Filed: Apr. 1, 1970
[21] Appl. No.: 25,542

[52] U.S. Cl. .............................. 350/150, 350/147, 350/160
[51] Int. Cl. ........................................................... G02f 1/30
[58] Field of Search ................... 350/147, 150, 157, 160, 161

[56] References Cited

UNITED STATES PATENTS 3,512,876   5/1970   Marks ........................... 350/150 UX

OTHER PUBLICATIONS

Marks, " Electrooptical Characteristics of Dipole Suspensions" App. Opt., Vol. 8, No. 7 (July, 1969) pp. 1,397– 1,412

Primary Examiner—David Schonberg
Assistant Examiner—Paul R. Miller
Attorney—Pennie, Edmonds, Morton, Taylor and Adams

[57] ABSTRACT

A light valve having a cell containing a fluid suspension of minute particles dispersed therein capable of orientation by an electric field, has applied thereto an alternating voltage having a frequency at least as high as approximately 325 KHz, and preferably 400 KHz, or higher, to prevent agglomeration of the particles over long periods of use. Generally needle-shaped particles of herapathite may be employed.

4 Claims, 5 Drawing Figures

Patented April 11, 1972

3,655,267

INVENTORS
MATTHEW FORLINI

BY
Pennie, Edmonds, Morton, Taylor & Adams

ATTORNEYS

LIGHT VALVES WITH HIGH FREQUENCY EXCITATION

BACKGROUND OF THE INVENTION

This invention relates to light valves of the type including a cell containing a fluid suspension of minute particles capable of orientation by an electric field to change the transmission of light through the suspension.

Light valves of this type have been known for many years. Fluid suspensions of herapathite in a suitable liquid have commonly been preferred, although other types of particles have been suggested. In general, the shape of the particles should be such that in one orientation they intercept more light than in another orientation. Particles which are needle-shaped, rod-shaped, lath-shaped, or in the form of thin flakes, have been suggested. The particles may variously be light absorbing or light reflecting, polarizing, birefringent, metallic or nonmetallic, etc. In addition to herapathite, many other materials have been suggested such as graphite, mica, garnet red, aluminum, periodides of alkaloid sulphate salts, etc. Preferably dichroic, birefringent or polarizing crystals are employed.

Very finely-divided or minute particles are employed, and are suspended in a liquid in which the particles are not soluble, and which is of suitable viscosity. In order to help stabilize the suspension when in the nonactuated state, a protective colloid should preferably be used to prevent agglomeration or settling.

A fluid suspension which has been used with success uses generally needle-shaped particles of herapathite, isopentyl acetate as the liquid suspending medium, and nitrocellulose as a protective colloid. Plasticizing agents such as dibutyl phthalate have also been used in the suspension to increase the viscosity.

To apply an electric field to the suspension, conductive area electrodes are provided on a pair of oppositely disposed walls of the cell, and an electric potential applied thereto. The electrodes may be thin transparent conductive coatings on the inner sides of the front and rear walls of the cell, thereby forming an ohmic type cell wherein the electrodes are in contact with the fluid suspension. It has also been suggested to cover the electrodes with a thin layer of transparent material such as glass in order to protect the electrodes. Such thin layers of glass form dielectric layers between the electrodes and the fluid suspension, and the cells may be termed capacitive cells. Direct, alternating and pulsed voltages have been applied to the electrodes in order to align the particles in the fluid suspension. When the voltage is removed, the particles return to a disoriented random condition due to Brownian movement.

The frequency employed for energizing the cell has an effect on the light transmission of the cell when in its open or energized condition, and hence on the density ratio between closed (unenergized) and open conditions. This has previously been recognized. Although frequencies as high as 100 KHz (kilo-hertz) have been mentioned in the literature for energizing such cells, the indications have been that frequencies above about 30 KHz are of little value since the density ratio curves become asymptotic above about 30 KHz and there is little increase in light transmission above 30 KHz.

Commonly the front and rear walls of the cell are transparent, for example, panels of glass or plastic. With no applied field, and random orientation of the particles, the cell has a low transmission to light and accordingly is in its closed condition. When a field is applied, the particles become aligned and the cell is in its open or light transmitting condition. Instead of making the rear wall transparent, it may be made reflective. In such case light is absorbed when the cell is unenergized and is reflected when the cell is energized. These principal actions may be modified by employing light reflecting rather than light absorbing particles.

In such cells a serious problem is the agglomeration of the particles. While protective colloids are helpful in reducing or avoiding agglomeration in the stored or inactive condition, when the cell is in use the tendency to agglomerate increases. Depending on the particular suspension employed, and the voltage and frequency used, agglomeration may become noticeable in a matter of seconds, minutes or hours of use. One agglomeration has occurred, it tends to remain more or less permanently even though the exciting voltage is removed.

Such agglomeration considerably impairs the usefulness of the light valve since it creates inhomogeneities in the suspension and hence changes the light transmission from point to point. Also it reduces the ratio of optical density between the closed (unactuated) state and the open (actuated) state. Further, the density in the closed state may decrease.

It has now been found possible to avoid such agglomeration for long periods of time by using energizing frequencies substantially higher than those heretofore suggested.

BRIEF SUMMARY OF THE INVENTION

In accordance with the invention, frequencies above approximately 325 KHz are employed to energize the cell, and preferably 400 KHz or higher, to prevent substantial agglomeration in the fluid suspension over long periods of use.

BRIEF DESCRIPTION OF THE DRAWINGS

Referring to FIGS. 1 and 2, a light valve generally indicated as 10 is formed of two sheets of glass 11 and 12 having transparent conductive coatings 13 and 14 on the inner surfaces thereof. The conductive coatings form area electrodes for the application of energizing voltage to the cell. The glass plates are separated by a spacer 15 sealed to the glass plates around the edges thereof to provide a chamber 16 therebetween in which the fluid suspension of minute particles is placed. Once the fluid suspension has been introduced, the cell is sealed. The conductive coatings 13 and 14 are connected to a high frequency power supply 17. Inasmuch as the fluid suspension in chamber 16 is in contact with conductive coatings 13 and 14, this may be termed an ohmic type cell.

FIG. 3 is similar to FIG. 2 and corresponding parts are similarly designated. However, in FIG. 3 thin transparent coatings 18 and 19, for example glass, are placed over the area electrodes 13 and 14 so that the conductive coatings are protected from the fluid suspension. Since layers 18 and 19 are of dielectric material, the electrodes are, in effect, capacitively coupled to the fluid suspension in chamber 16.

FIG. 4a shows the closed or opaque condition of the cell 10. Here tiny acicular particles 21 are illustrated in random orientation. A beam of light impinging on cell 10, indicated by arrows 22, is substantially cut off.

FIG. 4b shows the open or light transmitting condition of the cell 10. Here, due to the application of an electric field, the particles 21 are aligned with their major axes perpendicular to the wall faces. In this condition, the particles intercept much less light than in the random condition shown in FIG. 4a. Consequently a considerable portion of the beam of light 22 passes through the cell, as indicated by the arrows 23.

Figure 1:
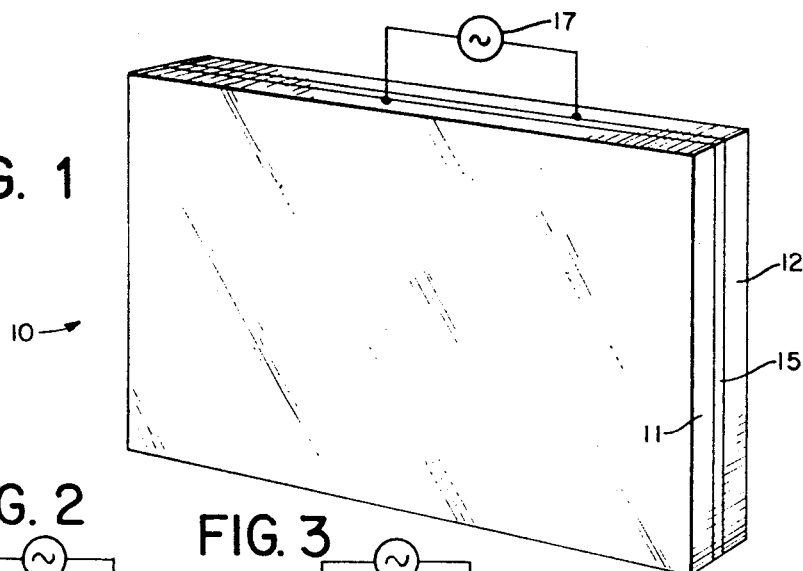
FIG. 1 is a general view of a known type of light valve with which the invention may be used.
Figure 2:
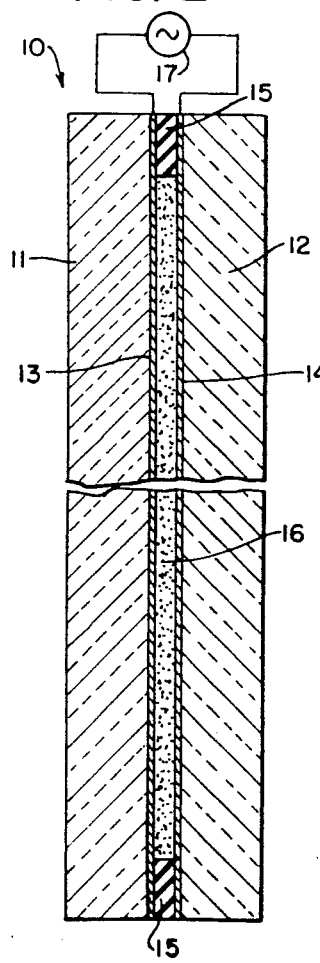
FIGS. 2 and 3 are cross-sectional views showing ohmic and capacitive type cells known in the art.
Figure 3:
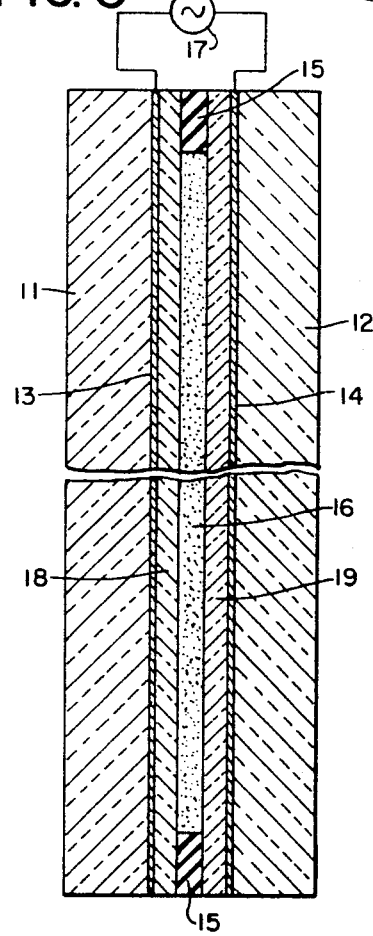
Figure 4A:
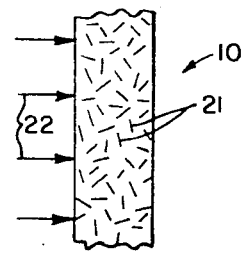
FIGS. 4a and 4b illustrate the closed and open states of the cell suspension, respectively.
Figure 4B:
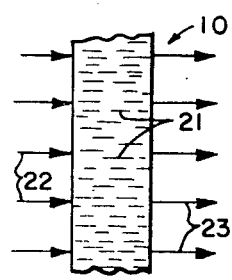

For operation at high frequencies, in accordance with the present invention, it is desirable to use relatively highly conductive electrodes so as to avoid excessive heating.

With an herapathite suspension in a cell having a separation of 33 mils between front and rear walls, and an applied voltage of 800 volts peak to peak, agglomeration began to occur in about 15 seconds at frequencies of 1 KHz, 5 KHz and 10 KHz. The exact appearance of the agglomeration changed somewhat with time, but after a few minutes the deleterious effect became quite serious. At 20 KHz, 50 KHz and 100 KHz, longer times elapsed before agglomeration occurred, but after 10 minutes or so agglomeration became noticeable. At 500 KHz no agglomeration was observed after an extended period of time, and light scatter was reduced below the level present at lower frequencies.

In another test, a cell was operated at about 400 KHz in the continuously open condition for 2,000 hours without noticeable agglomeration. Although the test was discontinued after 2,000 hours, there was no indication that an upper limit had been reached. Bursts of 400 KHz with a 20 percent duty cycle and a burst length of 40 milliseconds were applied continuously for 5 weeks without noticeable agglomeration, and no indication that an upper limit had been reached.

Various other frequencies in the range from 100 KHz to 500 KHz, and above, have been employed. Although it is difficult to determine the minimum frequency required to avoid noticeable agglomeration, the tests indicated that at approximately 325 KHz very long periods of operation are possible without noticeable agglomeration occurring.

Although the light valves described are commonly used with visible light sources, with suitable suspensions it may be possible to control the passage of similar types of electromagnetic radiation such as infrared and ultraviolet. Also, instead of using continuous area electrodes within the active region of the cells, the electrodes may be formed in patterns so as to exhibit a desired display. Further, instead of allowing light to pass through the cell from front to rear, the rear surface may be made reflective so as to provide a mirror of variable reflectivity. It will be understood that the term "light valve" applies to these various types of applications.

I claim:

1. A light valve including a cell containing a fluid suspension of minute particles dispersed therein capable of orientation by an electric field to change the transmission of light through the suspension, said cell having area electrodes on opposite sides of said fluid suspension for producing an electric field through the fluid suspension to change the light transmission thereof, in which the improvement comprises means for applying an alternating voltage to said electrodes having a frequency at least as high as approximately 325 kilo-hertz to change the light transmission of said fluid suspension, the peak to peak amplitude of said alternating voltage yielding a voltage gradient in said suspension not substantially greater than about 24 volts per mil.

2. A light valve in accordance with claim 1 in which said frequency is at least as high as approximately 400 kilo-hertz.

3. A light valve in accordance with claim 1 in which said minute particles are generally needle-shaped particles of herapathite..

4. A light valve in accordance with claim 2 in which said minute particles are generally needle-shaped particles of herapathite.

* * * * *